United States Patent [19]
Bergstein

[11] Patent Number: 5,947,678
[45] Date of Patent: Sep. 7, 1999

[54] WATER WHEEL WITH CYLINDRICAL BLADES

[76] Inventor: Frank D. Bergstein, 1201 Edgecliff Pl., Cincinnati, Ohio 45206

[21] Appl. No.: 09/109,222

[22] Filed: Jun. 30, 1998

[51] Int. Cl.[6] .................................................. F03B 7/00
[52] U.S. Cl. ........................... 415/3.1; 415/202; 415/203; 416/197 A
[58] Field of Search ................... 415/2.1, 3.1, 4.1, 415/202, 203, 204, 205, 224, 906; 416/197 A

[56] References Cited

U.S. PATENT DOCUMENTS

| | | | |
|---|---|---|---|
| 431,739 | 7/1890 | Buhlman | 415/202 |
| 646,713 | 4/1900 | Symons . | |
| 1,293,110 | 2/1919 | Karafas . | |
| 2,097,286 | 10/1937 | McGee . | |
| 4,039,849 | 8/1977 | Mater . | |
| 4,258,271 | 3/1981 | Chappell . | |
| 4,365,934 | 12/1982 | Mason . | |
| 4,436,480 | 3/1984 | Vary . | |
| 4,463,555 | 8/1984 | Wilcoxson . | |
| 4,467,217 | 8/1984 | Roussey . | |
| 4,512,714 | 4/1985 | Kaesser . | |
| 4,519,742 | 5/1985 | Van Buytene . | |
| 4,776,762 | 10/1988 | Blowers, Sr. . | |
| 4,872,805 | 10/1989 | Horiuchi . | |
| 4,890,976 | 1/1990 | Jansson . | |
| 4,923,368 | 5/1990 | Martin . | |
| 5,088,884 | 2/1992 | Bergstein | 415/3.1 |
| 5,249,923 | 10/1993 | Negus . | |
| 5,440,175 | 8/1995 | Mayo, Jr. . | |

FOREIGN PATENT DOCUMENTS

| | | | |
|---|---|---|---|
| 503530 | 6/1920 | France | 415/2.1 |
| 56-41402 | 4/1981 | Japan | 416/197 A |
| 57-32075 | 2/1982 | Japan | 415/2.1 |
| 63-75365 | 4/1988 | Japan | 415/3.1 |
| 121 | 1/1902 | United Kingdom | 415/203 |

OTHER PUBLICATIONS

IBM Technical Disclosure Bulletin, vol. 9, No. 2, Jul. 1966.

*Primary Examiner*—Christopher Verdier
*Attorney, Agent, or Firm*—Davidson & Gribbell LLP

[57] ABSTRACT

An improved liquid rotor device is provided having a cylindrically-shaped hub, which is supported by a horizontal shaft, and having several curved blades which are attached to the outer portions of the rotating hub. The horizontal shaft preferably rotates with the hub so that it can mechanically drive a device such as an electrical generator. The multiple blades mounted to the exterior surface of the hub are curved such that the longitudinal axis of each blade is parallel to the axis of rotation (i.e., the horizontal shaft). Each blade is arcuate in shape and preferably comprises a portion of the cylindrical wall of a hollow cylinder. In one embodiment of the, the rotating hub and blades sub-assembly is surrounded by a hollow cylindrical housing that is entirely submerged in a liquid, such as water. The surrounding hollow cylindrical housing has an inlet to receive the liquid into the area of the rotating blades and an outlet through which the liquid is discharged. The inlet preferably is in communication with the discharge of a constricting chamber that has a large opening area and a small discharge area, such as a portion of a venturi. By use of this chamber, the velocity of the liquid is increased as it approaches the inlet.

7 Claims, 6 Drawing Sheets

WATER WHEEL WITH CYLINDRICAL BLADES

TECHNICAL FIELD

The present invention relates generally to water or liquid rotor equipment and is particularly directed to water rotors of the type which can be used to drive electrical generators, or other mechanical equipment. The invention will be specifically disclosed in connection with a water rotor having multiple curved blades in one plane which, in one embodiment captures the liquid for a large portion of their rotation, and in a second embodiment utilizes hinged blades to present less air friction to the wind direction.

BACKGROUND OF THE INVENTION

Water rotor machines (or water wheels) are quite old in the art, and have been in use for centuries. Many water rotors are known as "turbines" and typically have a large vertical drop through which the water travels before striking the blades of the turbine, thereby gaining velocity to apply a greater force. Other water rotors or water wheels are submerged and use an inlet and an outlet through which the passage of the water is directed.

An example of a conventional water wheel having an inlet and outlet is U.S. Pat. No. 5,440,175 (by Mayo), which discloses a water wheel-driven generating unit that is to be used at a low head dam site. The inlet to the water wheel is an adjustable chute that extends from the dam crest to the water wheel. The Mayo water wheel has rotating longitudinal buckets (i.e., blades) that are designed to develop maximum energy over a wide range of flow conditions, and also to discharge debris. The buckets are vented as necessary to improve filling and discharge, and also to minimize vibration. Retention of water in the buckets until each one reaches the lowest point of travel is provided by an adjustable shroud. The shape of the bucket periphery is curved from an angle parallel to the chute at its lowest slope to an angle passing through the center of rotation of the water wheel, with the outer curved radius equal to one-half the bucket depth. The shroud can be moved away from the main housing to allow debris to be dislodged. Vents are provided near each bucket to allow an escape path for any air trapped between the filling water as the buckets rotate. Later, as the buckets become empty of water, air must take its place and the vents are designed to allow air back into the bucket to create smooth water dumping.

U.S. Pat. No. 1,293,110 (by Karafas) discloses a water wheel used on a ship, having an inlet and an outlet at the bottom. The blades of the impeller have a generally curved appearance and are very closely spaced together, essentially comprising pairs of half-blades that are mounted into one overall junction near the hub of the wheel.

U.S. Pat. No. 4,436,480 (by Vary) discloses a hydro-turbine apparatus to generate electricity. The turbine spins in the vertical plane and is designed to be submerged in a channel of water that will spin its vanes upon impact. On the inlet side of the turbine, a scoop member captures water flowing toward the turbine wheel and directs it behind each of the rotating vanes. This arrangement dumps water behind the rotating vanes at the earliest advantageous moment, since normally water would not effectively act on a vane until it is about to its horizontal position. The inlet and outlet of the turbine wheel are approximately 180 degrees from one another along the rotational movement of the vanes.

Some of the prior water wheels are provided with a buoyant rotatable drum in which the blades travel both through liquid and through a gas (i.e., air). For example, U.S. Pat. No. 2,097,286 (by McGee) discloses a power generating apparatus that uses a water wheel that is placed in a river. The McGee water wheel has curved blades that run parallel to one another, and have a somewhat concave shape to catch the current flow of the water. The water wheel is buoyant, and can rise or fall with the water level of the river. A vertical post is embedded in the river bottom, and an arm is pivotally attached by a pivot pin to the post. A DC generator is mounted within the interior of the cylindrical drum that holds the water wheel and its parallel blades.

Another patent that discloses a water wheel in which blades can protrude into air is U.S. Pat. No. 4,519,742 (by Van Buytene) which discloses a water wheel-type device that has a rotatable shaft with blades that are moved by flowing water. Each of the blades has at least one gate and a slide that can move the gate from an open to a closed position. When the gate is in its open position, it will allow fluid to pass through a corresponding opening in the blade. This would occur when the blade is protruding into air, so as to minimize friction caused by the air against the blade. When the blade enters the water, the gate slides to its closed position so that the water will impact against the gate to help force the blade to rotate in the proper direction.

U.S. Pat. No. 646,713 (by Symons) discloses a water wheel comprising a drum having hinged blades that present their surfaces in desirable positions while in the water, and do not waste the power of the wheel by forcing the water downward as they enter the water, or by lifting water as they rise or by encountering an unnecessary resistance of air as they rotate out of the water. The blades at positions "$i^{15}$" and "$i^{16}$" catch the water flow as the blades are about to leave the liquid domain and enter the gaseous domain. Once the blades are out of the water, the blades, by their own weight, pivot to the positions shown as "$i^1$" and "$i^2$", and come to rest against an arm "n". The blades stay in that relative position until the blades are about to re-enter the water, at which time the blades further pivot to a position that is radial with respect to the center of the water wheel. This is illustrated by the dashed lines in the lower left quadrant and the very middle bottom spoke of the water wheel on FIG. 2. According to Symons, the blades are in their "feathered" position, ostensibly to minimize their friction or drag upon re-entering the water. After the blades have passed again into the water, they stay in the feathered position until they have rotated another 90 degrees, and they finally begin to pivot again so that they will catch the water and can then further help to propel the water wheel when back at their original positions at $i^{15}$ and $i^{16}$. There is some inefficiency in this design, particularly since the blades must re-pivot while they are already in the water, and thereby provide no thrust during the re-pivoting that would help propel the rotation of the water wheel.

It would be advantageous to provide a water rotor having a greater efficiency by capturing the water for a very large portion of the rotational travel of the blade of the water rotor. For water rotors that are buoyant and have blades that travel through the air for a portion of their rotation, it would be advantageous to minimize the air friction or wind resistance of the rotating blades during the portion of rotation that they travel through the air, especially at times when the air is moving in a direction that generally opposes such rotation.

OBJECTS OF THE INVENTION

Accordingly, it is a primary object of the present invention to provide a liquid rotor device which efficiently operates when fully submerged by "trapping" the moving liquid for a large percentage of the rotational travel of the blades from the time the liquid enters at an inlet until it is discharged at an outlet.

It is another object of the present invention to provide a submerged liquid rotor device that has a constricting venturi effect to increase the velocity of the moving liquid as that liquid enters the inlet of the liquid rotor.

It is a further object of the present invention to increase the efficiency of a liquid rotor device by providing an expanding venturi effect at its outlet to further increase the efficiency by lowering the pressure differential between the inlet and the outlet of the liquid rotor device.

It is a yet further object of the present invention to provide a buoyant liquid rotor device in which the blades travel both through a liquid and through gaseous air during portions of their rotation, and in which the blades present a reduced air resistance in situations where the wind direction would oppose rotation of the blades.

It is yet another object of the present invention to provide a buoyant liquid rotor device that has hinged blades to both increase the efficiency of the blades as they travel through the liquid, and to reduce the air resistance of the blades as they travel through the gaseous air in situations where the wind direction would otherwise oppose the travel of such blades.

It is yet a further object of the present invention to provide a buoyant liquid rotor device that is capable of floating up or down in a vertical plane while driving a pivotable shaft that will, in turn, drive an electrical generator.

Additional objects, advantages and other novel features of the invention will be set forth in part in the description that follows and in part will become apparent to those skilled in the art upon examination of the following or may be learned with the practice of the invention.

SUMMARY OF THE INVENTION

To achieve the foregoing and other objects, and in accordance with one aspect of the present invention, an improved liquid rotor device is provided having a cylindrically-shaped hub, which is supported by a horizontal shaft, and having several curved blades which are attached to the outer portions of the rotating hub. The horizontal shaft preferably rotates with the hub so that it can mechanically drive a device such as an electrical generator. The multiple blades mounted to the exterior surface of the hub are curved such that the longitudinal axis of each blade is parallel to the axis of rotation (i.e., the horizontal shaft). Each blade is arcuate in shape and preferably comprises a portion of the cylindrical wall of a hollow cylinder.

In one embodiment of the present invention, the rotating hub and blades sub-assembly is surrounded by a hollow cylindrical housing that is entirely submerged in a liquid, such as water. The surrounding hollow cylindrical housing has an inlet to receive the liquid into the area of the rotating blades and an outlet through which the liquid is discharged. The inlet preferably is in communication with the discharge of a constricting chamber that has a large opening area and a small discharge area, such as a portion of a venturi. By use of this chamber, the velocity of the liquid is increased as it approaches the inlet. In an alternative embodiment, the discharge is in communication with a second expanding chamber that has a small intake area and a large exhaust area through which the discharge liquid will pass. In this alternative embodiment, it is preferred that the area of the intake of the first constricting chamber is substantially equal to the area of the exhaust of the expanding second chamber, thereby minimizing the hydraulic losses through the system.

In a second embodiment, the rotating hub and blades sub-assembly is made to be buoyant so that the centerline of the rotating hub will be approximately at the surface of the liquid, so that the liquid rotor will essentially float along the surface of, for example, a stream, river or canal. In this second embodiment, there is no surrounding hollow cylindrical housing, but instead the curved blades are directly exposed to the moving liquid, as well as to the wind of the gaseous air above the surface of the liquid. If the direction of the liquid current is substantially the same as the wind direction, then the wind will tend to inhibit the rotation of the blades and hub sub-assembly. In order to provide a reduced cross-sectional area against which the wind can act, the curved blades are hinged at the surface of the cylindrical hub, so that the wind will have less surface area to act against.

In another alternative embodiment, the buoyant wind rotor is supported by a pair of vertical supports which constrain the liquid rotor to floating up and down in a single vertical plane. The horizontal shaft running through the rotating hub is supported by a bearing surface that will ride up and down along these vertical supports. The mechanical output of the liquid rotor is then connected to a set of shafts, including one shaft that can move through an angle by use of universal joints. This same shaft will preferably be adjustable in length, so as to allow the liquid rotor sub-assembly to remain fixed in one location in the horizontal plane while moving up or down in the vertical plane. At the same time, the driven equipment (e.g., an electrical generator) will be able to remain at a single stationary point in the horizontal plane.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
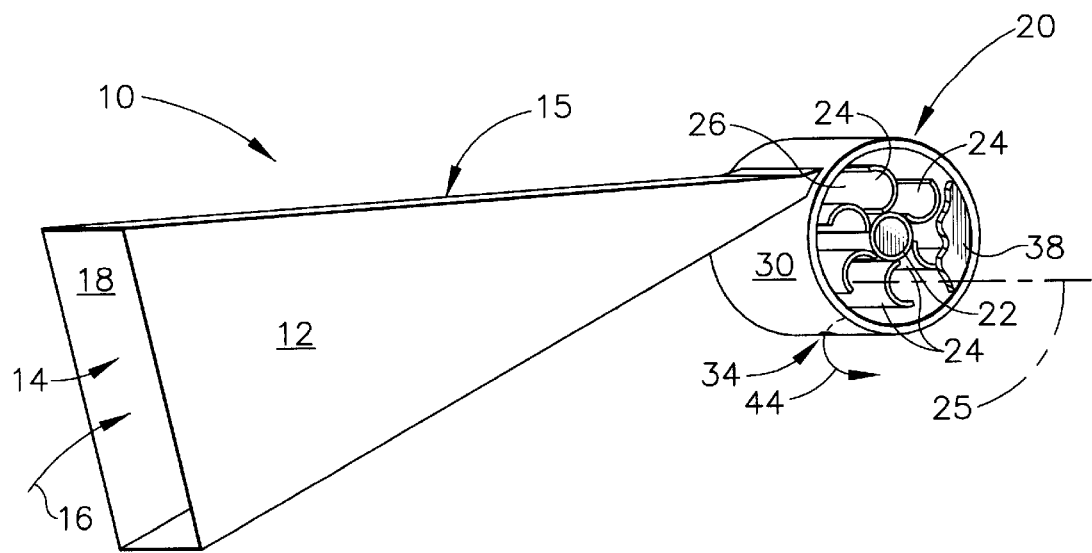
FIG. 1 is a perspective view of a liquid rotor apparatus having a rotatable cylindrical hub with curved blades attached, surrounded by a hollow cylinder and having a constricting intake chamber attached to the inlet of the hollow cylinder, constructed in accordance with the principles of the present invention.
Figure 2:
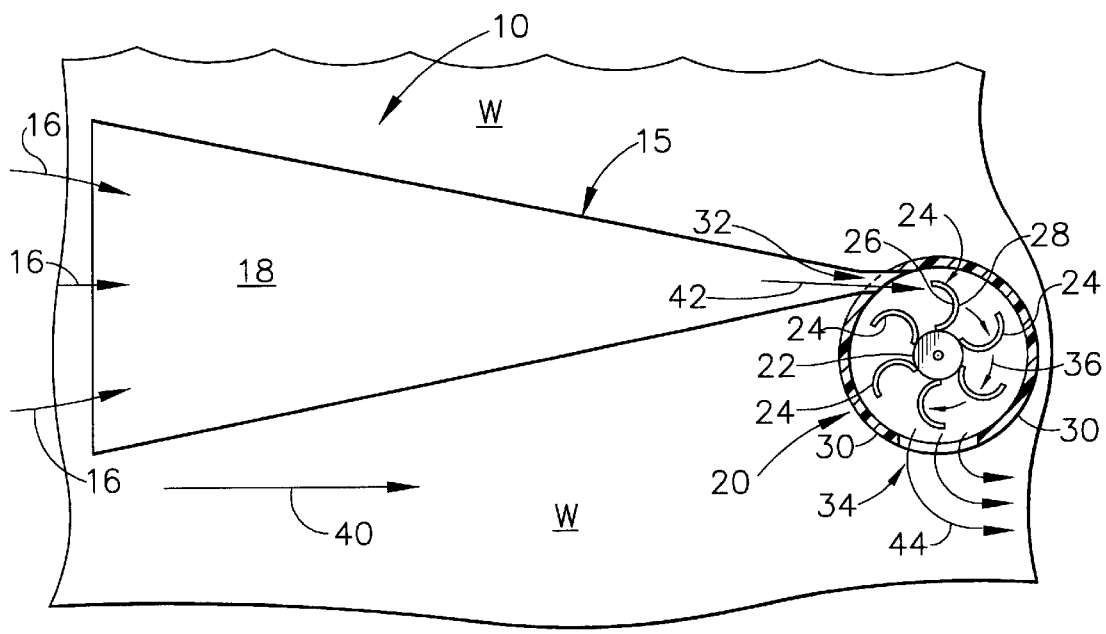
FIG. 2 is a side elevational view of the liquid rotor apparatus of FIG. 1.

Referring now to the drawings, FIGS. 1 and 2 show a liquid rotor assembly generally designated by the reference numeral 10, having a sub-assembly 20 that contains a rotating hub 22 and set of blades 24, along with an intake chamber 15 having an opening 14. As seen on FIG. 2, the liquid rotor assembly 10 is totally submerged within a liquid (e.g., water) which is generally depicted by the letter "W", and the direction of travel of the liquid as it enters the chamber through opening 14 is indicated at the arrows 16. This liquid direction corresponds to the direction of the current, which is indicated at the arrow 40.

As seen on FIG. 1, the intake chamber 15 has a side wall 12, an intake opening 14 and a second side wall 18. On FIG. 2, the intake chamber 15 is seen to discharge its liquid contents along the path of the arrow 42, which flows through an inlet opening 32 in a hollow cylinder 30 with side walls (such as at 38) that acts as the housing for the liquid rotor sub-assembly 20. A similar opening at the reference numeral 34 in the hollow cylinder 30 acts as the outlet of the liquid rotor sub-assembly 20.

The liquid rotor apparatus 10 will preferably be submerged in water that has a constant motion, such as in the case of a canal, stream, or river. The liquid flow would enter intake chamber 15 at the arrows 16, then be somewhat increased in velocity due to the shape of the side walls 12 and 18 of intake chamber 15 before the liquid enters the inlet 32 along the arrow 42. Once the liquid flows through inlet 32, the liquid will strike the surface of the rotatable blades 24, which each have a curved profile with a concave surface 26 and a convex surface 28. The liquid will strike the concave surface 26 thereby propelling the blades in a clockwise direction as seen on FIG. 2. The liquid will continue to follow the arrows 36 while pushing against the blades 24, thereby moving them in a clockwise direction until the liquid reaches outlet 34, which is another opening in the cylindrical housing 30 through which the liquid will discharge along the arrows 44.

The liquid rotor sub-assembly 20 comprises a rotating hub 22, a set of curved blades 24, and a hollow cylindrical housing 30 having inlet and outlet openings 32 and 34, respectively. Blades 24 preferably are semi-circular in profile (as seen from their sides, as in FIG. 2) which gives them a "C"-type shape in appearance, and each blade 24 has a longitudinal axis depicted by the reference numeral 25. This longitudinal axis 25 is substantially in parallel with the axis of rotation (i.e., the centerline) of rotating hub 22.

Figure 7:
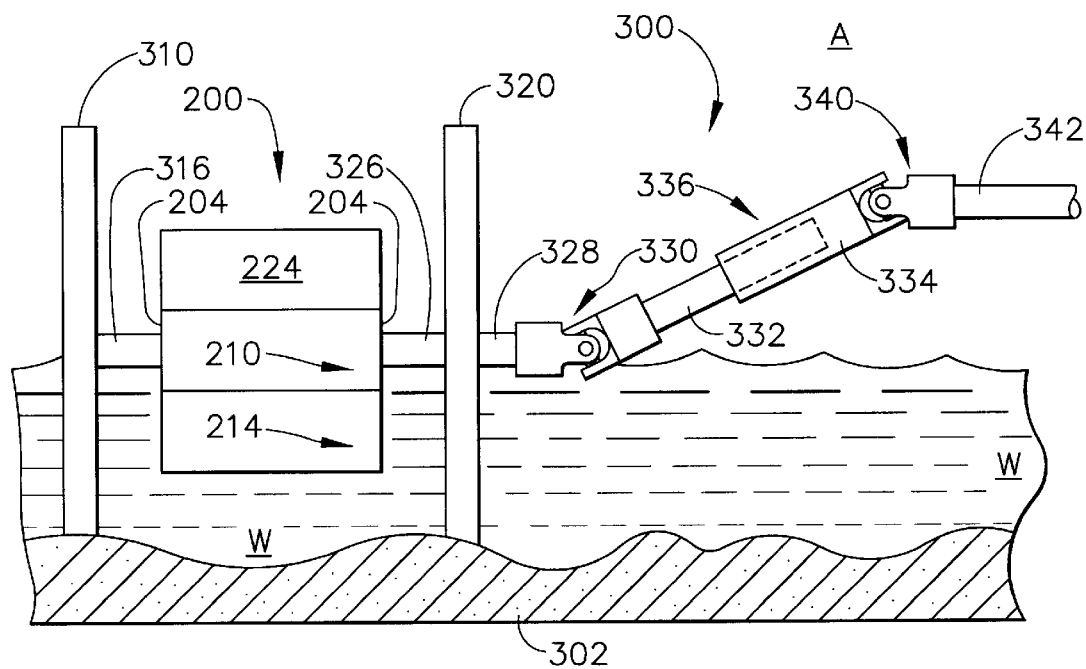
FIG. 7 is a front elevational view of the buoyant liquid rotor apparatus of FIG. 4 as mounted to a set of vertical supports and having an output shaft to drive an electrical generator.
Figure 8:
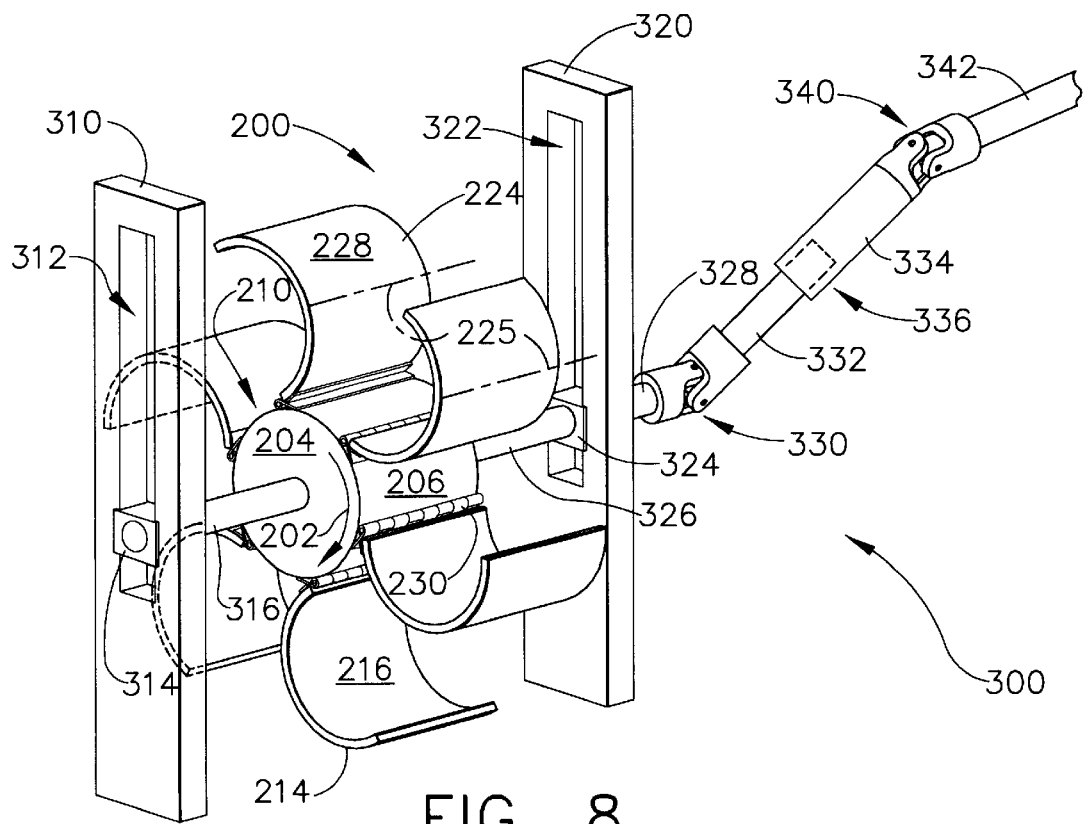
FIG. 8 is a perspective view of the buoyant liquid rotor apparatus and vertical support assembly of FIG. 7.

The rotating hub 22 will preferably be connected to some type of output shaft (not shown), which will be similar to the output shaft 328 depicted on FIGS. 7 and 8. As stated above, the liquid velocity will somewhat increase as it travels through the constricting shape of the intake chamber 15, between the times that the liquid travels along the arrows 16 until it arrives at the arrow 42. This will help to increase the efficiency of the liquid rotor apparatus 10, and to increase its power output.

Another feature that will tend to increase efficiency of the liquid rotor apparatus 10 is the locations of the inlet 32 and outlet 34 as compared to the rotational travel of the blades 24. As the liquid enters at the inlet 32, it will contact the rotatable blades 24 for over 180 degrees of their rotational travel before reaching the outlet 34. This insures that most of the power behind the flowing liquid will be imparted to the rotatable blades 24 for a long duration of their rotational travel. The discharge opening 34 is placed near the very bottom of the cylindrical housing 30 so as to not greatly interfere with other liquid flowing within the body of water W, and also is placed so as to essentially prevent the outside liquid from entering at the discharge opening 34.

The materials used for all portions of the liquid rotor apparatus 10 preferably are to be impervious to rust or other form of corrosion, while at the same time being materials that are easy to construct and assemble. The rotatable hub 22 and blades 24 preferably are made of a light-weight material, such as plastic, so as to provide the least amount of inertia to rotational movement. Of course, metal materials could be used for the same components. In the preferred embodiment, the blades 24 are constructed of PVC material, and comprise a semi-circular section of a PVC pipe, and are attached to the rotatable hub 22 along a substantially linear edge of cylindrical PVC pipe section by an adhesive material. Naturally, other forms of attachment and other construction materials could be used to build the liquid rotor apparatus 10, without departing from the principles of the present invention.

Figure 3:
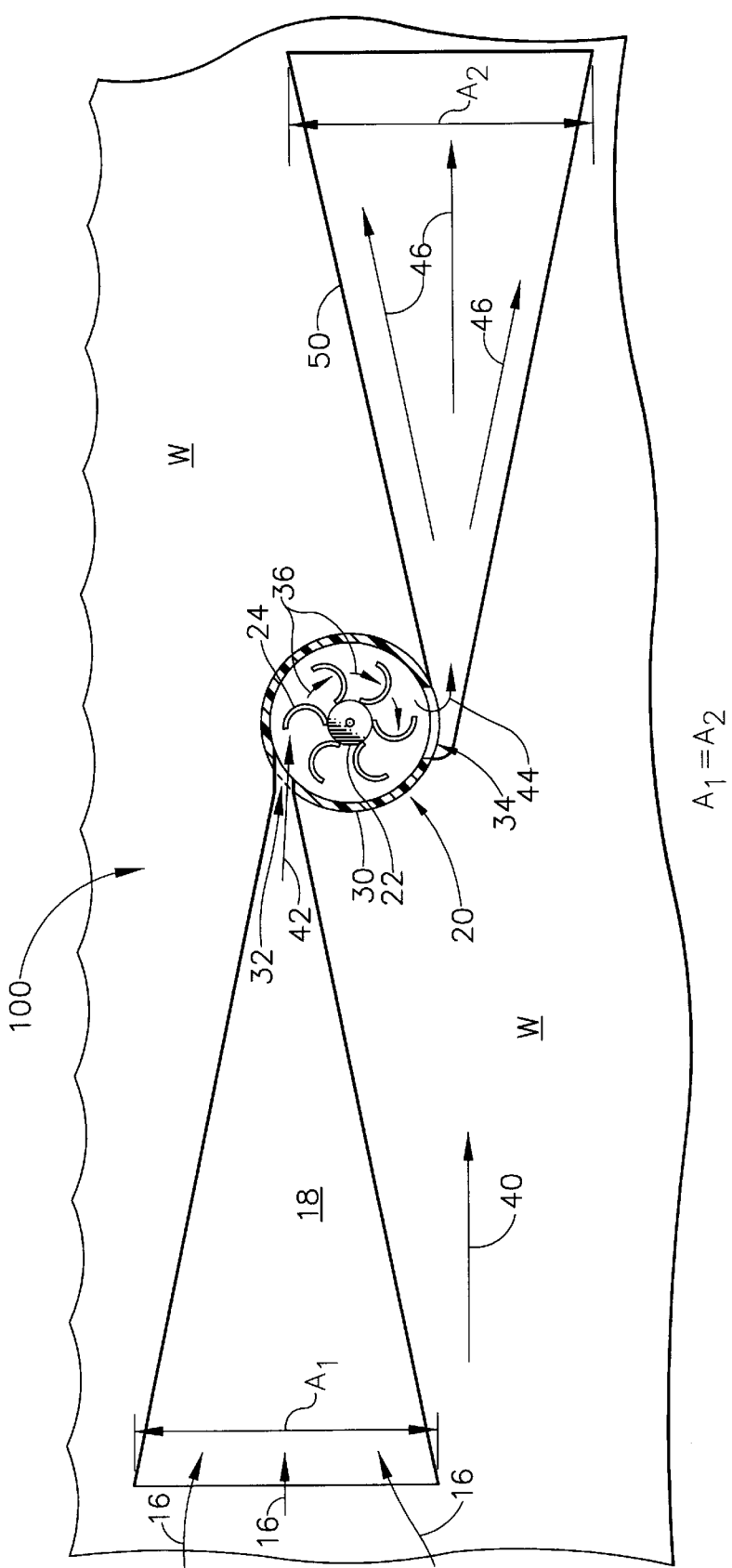
FIG. 3 is a side elevational view of a liquid rotor apparatus similar to that of FIG. 1, however, an expanding exhaust chamber is attached to the outlet of the hollow cylinder.

On FIG. 3, an alternative embodiment liquid rotor apparatus 100 is provided in which its outlet 34 does not dump liquid directly back into the infinite volume of the stream, river, or canal, but instead directs the liquid into an exhaust chamber 50 which expands in area as the liquid follows downstream along the arrows 46. It is preferred that the area of the opening of intake chamber 15, designated by "$A_1$" be substantially equal to the area at the discharge opening of the exhaust chamber 50, at the area designated as "$A_2$". In this manner, the total liquid rotor apparatus 100 will have a venturi-type shape, and will incur a minimal back-pressure due to the constriction and then expansion of the areas through which the liquid flows as it passes through rotor apparatus 100.

As in the liquid rotor apparatus 10 depicted on FIGS. 1 and 2, the apparatus 100 of FIG. 3 has a greater efficiency by causing the liquid to travel through a large portion of the rotational travel of the blades 24 between the inlet 32 and the outlet 34 of the liquid rotor sub-assembly 20. In fact, while using an exhaust chamber 50, the outlet opening 34 could be located even further clockwise along the travel of the liquid movement along arrows 36, thereby providing a greater efficiency. This would be possible since the exhaust chamber 50 would protect the outlet opening 34 from interference with the outside liquid current 40. There would be a certain trade-off when attempting to move the outlet opening 34 further along the rotational travel of the blades 24, since the liquid would have to change direction by over 90 degrees as it travels along the arrow 44 and enters the smaller cross-section area of the exhaust chamber 50. The configuration shown on FIG. 3 is probably the optimum arrangement with respect to efficiency.

It will be understood that the venturi shape provided by the inlet and discharge chambers could be modified without departing from the principles of the present invention. Moreover, it will be understood that the precise locations of the inlet and outlet of the housing for the liquid rotor assembly could be modified without departing from the principles of the present invention.

Figure 4:
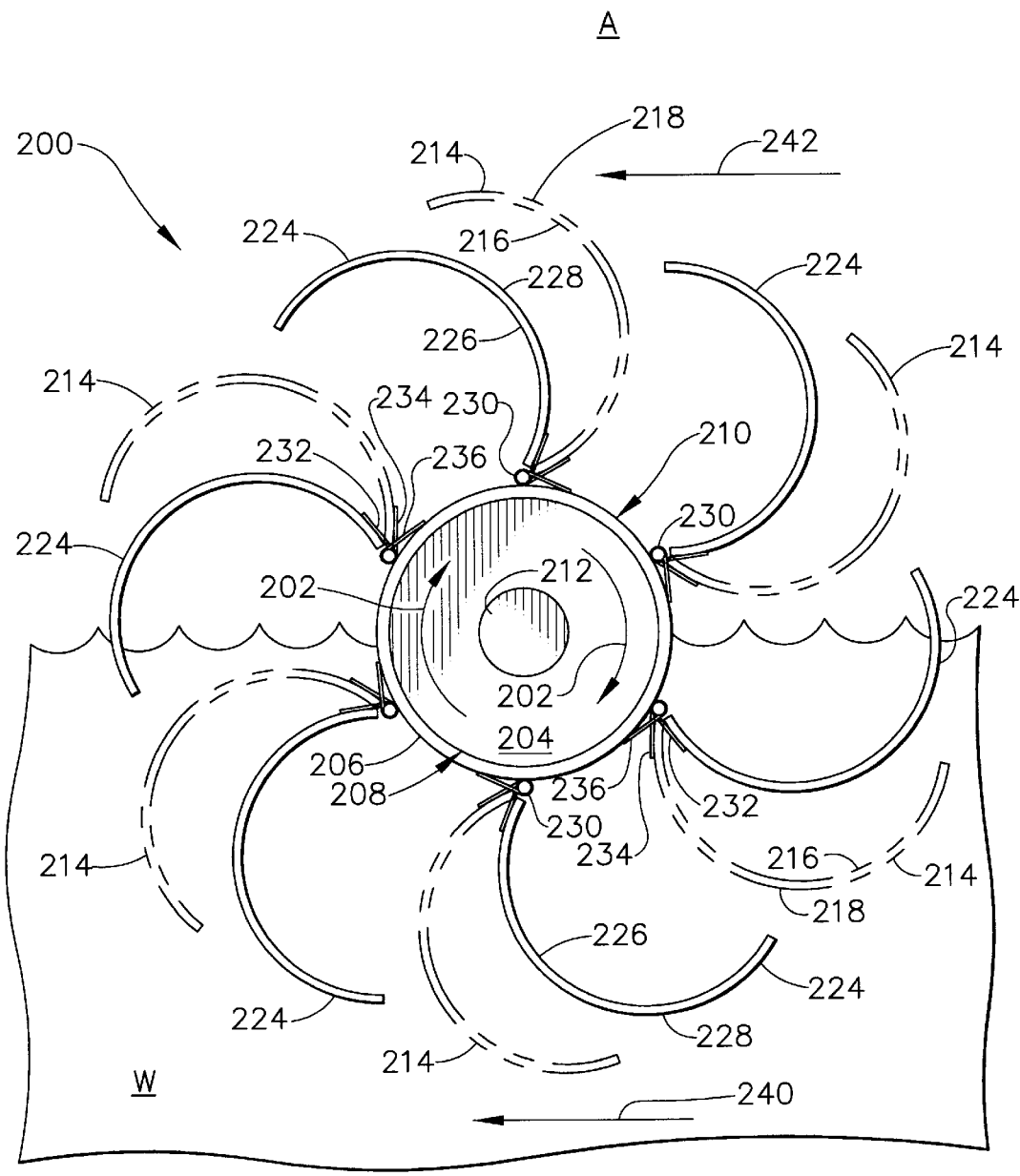
FIG. 4 is a side elevational view of a buoyant liquid rotor apparatus having a cylindrical hub and curved blades that are hinged at their point of connection to the cylindrical hub, as constructed according to the principles of the present invention.

A second embodiment generally designated by the reference number 200 of a liquid rotor apparatus is depicted on FIG. 4 in which the entire apparatus is made buoyant so that it will float on the surface of the liquid body. On FIG. 4, a cylindrical hub 210 comprises an outer housing 206, a centerline shaft 212, and an interior chamber 208. This entire hub sub-assembly 210 rotates in the clockwise direction on FIG. 4, as indicated by the arrows 202.

The chamber 208 will preferably be filled with a gaseous compound such as air so that the entire liquid rotor apparatus 200 will float at approximately the centerline of the shaft 212. This is a accomplished by providing an air-tight end plate 204 (see FIGS. 6, 7, and 8) that will seal the chamber 208 on both sides of the water rotor apparatus 200. By filling the chamber with the proper quantity and compound of a gas, the proper buoyancy will be achieved so that the liquid rotor apparatus 200 will float in the body of water designated by the letter "W" on FIG. 4.

The liquid body on which the liquid rotor apparatus 200 is to be placed will preferably have continuous current, as indicated by the arrow 240, so that the blades of the liquid rotor apparatus will be forced to rotate because of this current. The apparatus 200 will, therefore, be most useful in a canal, stream, or river which always flows in a single direction. Since the liquid rotor apparatus 200 is made buoyant, its blades will extend above the water line through about 50% of the blades' rotational travel, and the direction of the air may oppose the rotation of these blades, as for example, when the wind is in the direction depicted by the arrow 242 for the body of air designated by the letter "A".

In order to present a smaller surface area as a target against which the wind will impact, the blades of the liquid rotor apparatus 200 are hinged at their connecting point to the outer cylindrical surface of the hub 210. On FIG. 4, each of the six blades is shown in its two extreme positions, in solid lines for situations where the blades 224 are in a position to present a lower surface area profile to the direction of the wind, and a second position in dashed lines for the blades 214 when in their position where the direction of the liquid current will propel the blades to rotate the liquid rotor assembly 200. The reference number designations 214 and 224 represent the two different positions for the same physical blade in each of the six blade positions depicted on FIG. 4. Each blade has a concave and convex surface, and for the blades 214 depicted in dashed lines, the concave surface is at 216 and the convex surface is at 218. For the blades 224 depicted in their low surface area profile position, the concave surface is depicted at 226 and the convex surface at 228.

Figure 6:
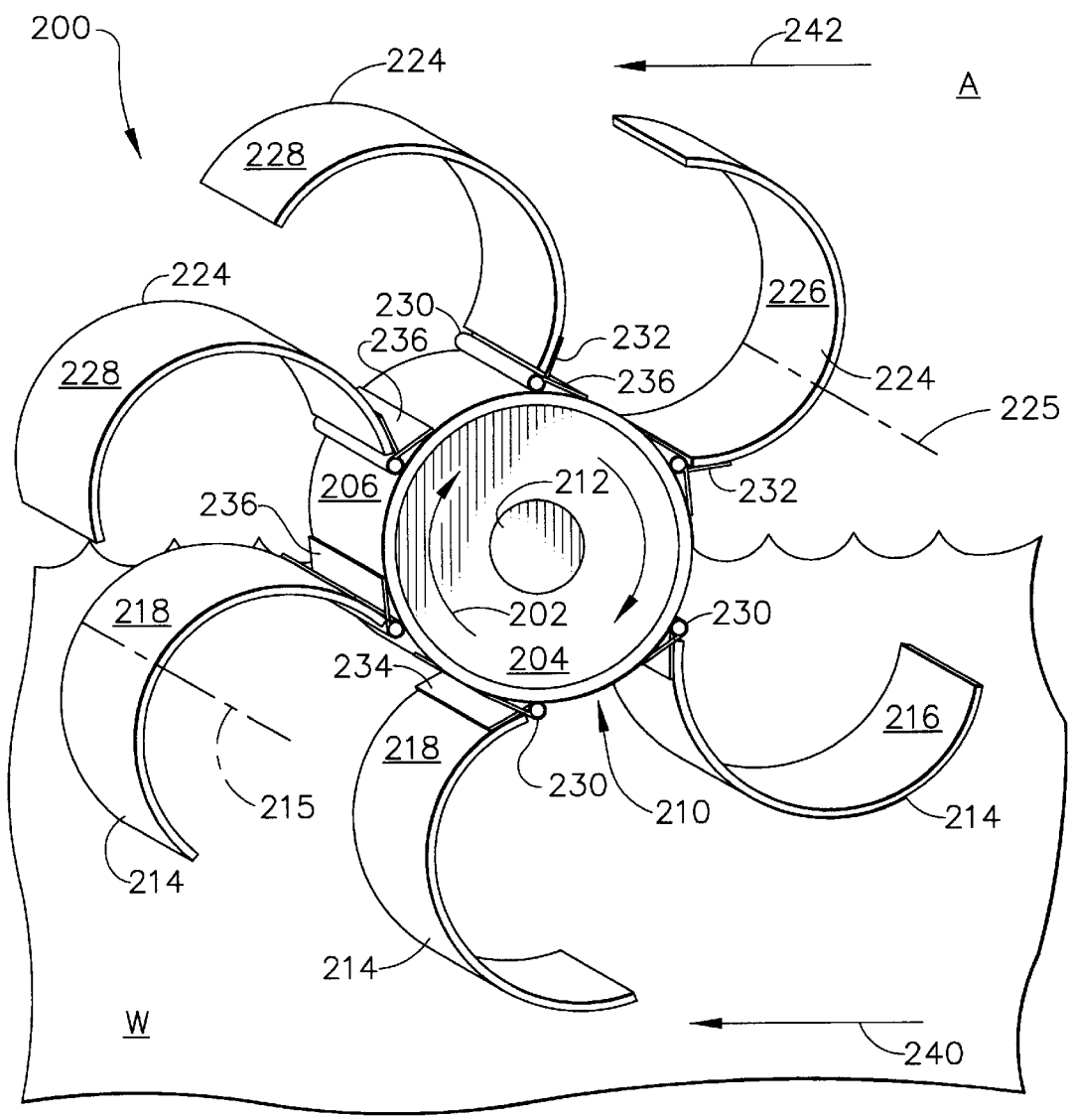
FIG. 6 is a perspective view of the buoyant liquid rotor apparatus of FIG. 5.

Blades 224 (and 214) preferably are semi-circular in profile (as seen from their sides, as in FIG. 4) which gives them a "C"-type shape in appearance, and each blade 224 and 214 has a longitudinal axis depicted by the reference numerals 225 and 215, respectively (see FIG. 6). The longitudinal axes 225 and 215 are substantially in parallel with the axis of rotation (i.e., the centerline) of rotating hub 210.

Each of the curved blades is attached to a hinge 230 along a substantially linear edge of cylindrical PVC pipe section making up the blade, of which hinges 230, in the preferred embodiment, have a pair of flanges that will act as the hinges' attachment points. One of the flanges, at reference numeral 236, attaches the hinge to the outer surface of the cylindrical housing 206. The other flange is depicted as reference numeral 232 when the blade is in its lower surface area profile position at 224, and this same hinge is given the reference numeral 234 when its corresponding blade is in its "dashed" position 214.

Many different materials could be used to construct the liquid rotor apparatus 200, although all materials should be impervious to rust or other type of corrosion when immersed in water (or other operating liquid) for long durations. This is particularly important for the hinges 230, because they must remain relative free to operate so that the blades can be moved from their one extreme position at 224 to their opposite extreme position at 214 without any undue friction. In the preferred embodiment, the curved blades are constructed of a portion of a PVC pipe, which is cut into two halves along its centerline axis, each half becoming one of the blades depicted on FIG. 4.

Figure 5:
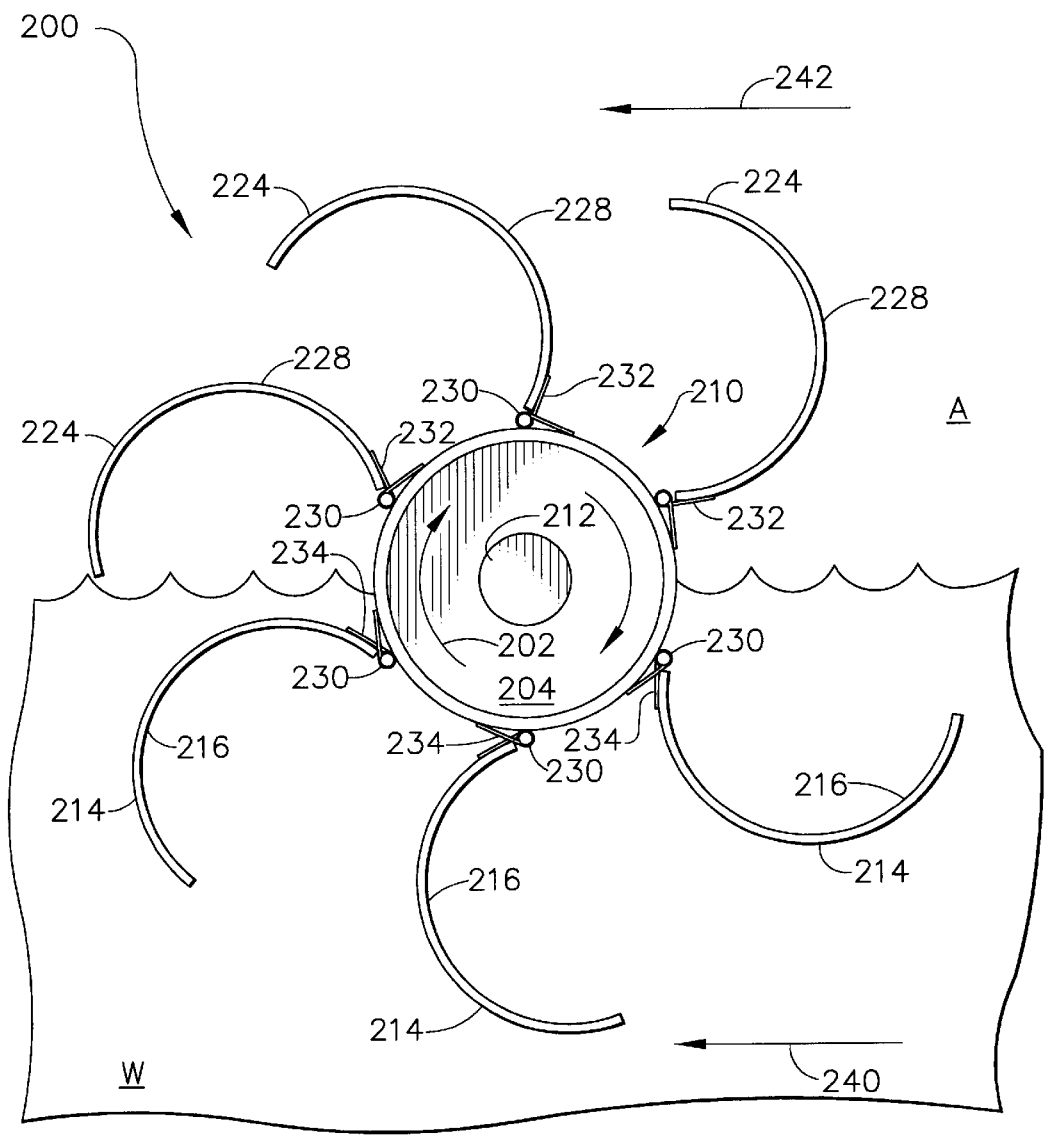
FIG. 5 is a side elevational view of the buoyant liquid rotor apparatus of FIG. 4 in which the curved blades are shown in their typical operating positions.

FIG. 5 illustrates the liquid rotor apparatus 200 with the blades in their typical operating positions when the water (or other liquid) current direction 240 is in the same direction as the wind direction 242. In this situation, the submerged blades 214 will be forced into their "liquid driven position" by force of the liquid water moving in the direction 240. When this occurs, the rotational movement of the blades will cause the entire liquid rotor assembly 200 to rotate in the clockwise direction as viewed on FIG. 5. However, once the blades become free of the liquid water (e.g., along the left side of FIG. 5), then the force of gravity and the wind direction 242 will cause the blades to move into their lower wind resistance profile position 224. If the wind is strong enough, the blades will remain in their lower surface area profile position 224 until they are again submerged along the right hand side of FIG. 5. Once they re-enter the liquid water, the blades will be forced into their liquid-driven positions 214.

FIG. 6 is a perspective view depicting the liquid rotor apparatus 200 of FIG. 5. The blades are in their same positions as illustrated in FIG. 5, and some of the construction features of the apparatus 200 are more clearly discernible on FIG. 6.

FIGS. 7 and 8 illustrate the liquid rotor apparatus 200 as it is mounted in a set of vertical supports that retain the apparatus 200 within a single vertical plane as it moves up and down with the level of the liquid water W. On FIG. 7, it can be seen that two vertical supports 310 and 320 are constructed so as to be in parallel with one another, and which protrude from the body of air "A", through the body of liquid water "W", and into the earth at reference numeral 302. Two rotatable half-shafts at reference numerals 316 and 326 are used to mount the liquid rotor apparatus 200 between the vertical supports 310 and 320. The mechanical output of the rotor apparatus 200 is provided through the half-shaft 326, through its bearing 324 (see FIG. 8), and into an output shaft 328. The mechanical drive continues through a universal joint 330, then through a pivotable shaft assembly 336, through another universal joint 340, and into a final output shaft 342 which is used to drive an electrical generator (not shown) that preferably is mounted on the shore.

As the liquid rotor apparatus 200 rises and falls, due to the changing level of the liquid water "W", the angle of the pivotable shaft assembly 336 will change with respect to the horizontal plane. In view of this fact, the shaft assembly 336 preferably comprises two separate shafts 332 and 334 which will contain internal and external spline so that the total length of the shaft assembly 336 can vary as the angle of the shaft changes with respect to the horizontal plane. In this manner, the liquid rotor apparatus 200 can remain positioned in a fixed location with respect to the horizontal distance to the electrical generator, which would also be mounted at a fixed horizontal position with respect to the earth.

On FIG. 8, the bearings 314 and 324 can be viewed, and which receive the half-shafts 316 and 326. In addition, vertical slots 312 and 322 in their respective vertical supports 310 and 320 can be viewed, and these slots allow the bearings 314 and 324 to slide up and down within the vertical plane, thereby allowing the liquid rotor apparatus 200 to remain in a fixed horizontal position while vertically floating up and down as the liquid level rises and falls.

The materials used for the vertical supports, shafts, and universal joints should all be selected having physical properties so as to be relatively impervious to rust or other corrosion when immersed in water for long durations. This is particular important for the sliding bearing and slot combinations 312, 314, and 322, 344. This is also important for the universal joints 330 and 340.

A large variety of materials could be used to construct the features depicted in the liquid rotor apparatus 200, and its associated vertical supports and output shaft assemblies, without departing from the principles of the present invention. It will be understood that other blade shape configurations could be used along with the hinged connection points to the cylindrical hub 210 without departing from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A submerged liquid rotor apparatus, comprising: a rotatable central hub having a cylindrical surface; a plurality of curved blades attached to an outer surface of said central hub such that said blades exhibit a rotational travel in accordance with rotational movement of said hub; a substantially cylindrical housing with circular end walls that surrounds said rotatable central hub and curved blades, said housing having an inlet and an outlet, said inlet and outlet being spaced apart along the rotational travel of said blades by over 180 degrees; and an intake chamber in communication with said inlet, said intake chamber having an intake opening of an area that is larger than an area of said inlet, wherein said inlet acts as a discharge opening for said intake chamber; and wherein said intake opening and said outlet are each in direct communication with a liquid medium.

2. The submerged liquid rotor apparatus as recited in claim 10, wherein said blades are driven by a liquid that enters from said liquid medium through said intake chamber and said inlet, then exits through said outlet into said liquid medium.

3. The submerged liquid rotor apparatus as recited in claim 2, wherein said liquid comprises water.

4. The submerged liquid rotor apparatus as recited in claim 1, wherein each of said plurality of curved blades comprises a portion of a cylindrical wall of a hollow cylinder such that the longitudinal axis of each of said blades is substantially parallel with an axis of rotation of said central hub, wherein the physical attachment of each of said blades to said hub comprises a substantially linear edge of said portion of said cylindrical wall of said hollow cylinder.

5. A liquid rotor apparatus, comprising: a rotatable central hub having a cylindrical surface; a plurality of curved blades attached to an outer surface of said central hub, wherein each of said plurality of curved blades comprises a portion of a cylindrical wall of a hollow cylinder such that the longitudinal axis of each of said blades is substantially parallel with an axis of rotation of said central hub, wherein the physical attachment of each of said blades to said hub comprises a substantially linear edge of said portion of said cylindrical wall of said hollow cylinder; and a substantially cylindrical housing with circular end walls that surrounds said rotatable central hub and curved blades, said housing having an inlet and an outlet, said inlet and outlet being spaced apart along the rotational travel of said blades by over 180 degrees; an intake chamber in communication with said inlet, said intake chamber having an intake opening of an area that is larger than an area of said inlet, wherein said inlet acts as a discharge opening for said intake chamber;

wherein said liquid rotor apparatus is entirely submerged in a liquid medium, said intake opening and said outlet each being in direct communication with said liquid medium, and wherein all of said blades exhibit a rotational travel in accordance with rotational movement of said hub.

6. The submerged liquid rotor apparatus as recited in claim 5, wherein said blades are driven by a liquid that enters from said liquid medium through said intake chamber and said inlet, then exits through said outlet into said liquid medium.

7. The submerged liquid rotor apparatus as recited in claim 6, wherein said liquid comprises water.

* * * * *